United States Patent
Radosavljevic et al.

(10) Patent No.: US 7,068,481 B2
(45) Date of Patent: Jun. 27, 2006

(54) PROTECTION DEVICE WITH LOCKOUT TEST

(75) Inventors: Dejan Radosavljevic, LaFayette, NY (US); Thomas N. Packard, Syracuse, NY (US); Bruce F. Macbeth, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 10/729,392

(22) Filed: Dec. 5, 2003

(65) Prior Publication Data
US 2004/0080879 A1 Apr. 29, 2004

Related U.S. Application Data

(63) Continuation of application No. 10/263,028, filed on Oct. 2, 2002, now abandoned.

(60) Provisional application No. 60/326,531, filed on Oct. 2, 2001.

(51) Int. Cl.
*H01H 83/04* (2006.01)
(52) U.S. Cl. ............................ 361/42; 361/72
(58) Field of Classification Search ................ 361/42, 361/102, 72; 335/18, 34
See application file for complete search history.

(56) References Cited

U.S. PATENT DOCUMENTS

| | | | |
|---|---|---|---|
| 3,621,334 A * | 11/1971 | Burns et al. | 361/45 |
| 4,013,929 A * | 3/1977 | Dietz et al. | 361/643 |
| 4,549,241 A * | 10/1985 | Morris et al. | 361/145 |
| 5,083,114 A | 1/1992 | Nakashima et al. | |
| 5,600,524 A | 2/1997 | Neiger et al. | |
| 5,715,125 A | 2/1998 | Neiger et al. | |
| 5,956,218 A | 9/1999 | Berthold | |
| 6,052,265 A | 4/2000 | Zaretsky et al. | |
| 6,111,733 A | 8/2000 | Neiger et al. | |
| 6,309,248 B1 * | 10/2001 | King | 439/535 |
| 6,437,700 B1 | 8/2002 | Herzfeld et al. | |
| 6,472,882 B1 | 10/2002 | Tiemann et al. | |

(Continued)

Primary Examiner—Brian Sircus
Assistant Examiner—Z Kitov
(74) Attorney, Agent, or Firm—Daniel P. Malley; Bond, Schoeneck & King PLLC

(57) ABSTRACT

The present invention is directed to a protective device that includes a plurality of line terminals configured to be connected to an electrical distribution system, and a plurality of load terminals configured to be connected to at least one load. The device includes a fault detection circuit coupled to the plurality of line terminals and the plurality of load terminals. The fault detection circuit is configured to detect at least one fault condition. A power interruption circuit coupled to the fault detection circuit, the power interruption circuit including a set of movable contacts configured to decouple the plurality of line terminals from the plurality of load terminals in response to the fault detection circuit detecting the at least one fault condition. A reset mechanism is coupled to the power interruption circuit and configured to actuate the movable contacts to re-couple the plurality of line terminals to the plurality of load terminals. A lock-out mechanism is coupled to the reset mechanism. The lockout mechanism is configured to disable the reset mechanism in a lock-out state. A test circuit is coupled to the fault detection circuit and the lock-out mechanism. The test circuit is configured to provide a simulated fault signal to the fault detection circuit. The test circuit is configured to drive the lock-out mechanism from an unlocked state to the lock-out state if the fault detection circuit and/or power interruption circuit fails to respond to the simulated fault signal within a predetermined period of time.

34 Claims, 7 Drawing Sheets

U.S. PATENT DOCUMENTS

| | | | |
|---|---|---|---|
| 6,621,388 B1 * | 9/2003 | Macbeth | 335/18 |
| 6,670,870 B1 * | 12/2003 | Macbeth | 335/6 |
| 6,671,145 B1 * | 12/2003 | Germain et al. | 361/45 |
| 6,724,591 B1 * | 4/2004 | Clarey et al. | 361/42 |
| 6,788,173 B1 * | 9/2004 | Germain et al. | 335/18 |
| 2002/0145838 A1 | 10/2002 | Bonilla et al. | |

* cited by examiner

PROTECTION DEVICE WITH LOCKOUT TEST

CROSS-REFERENCE TO RELATED APPLICATIONS

This is a continuation of U.S. patent application Ser. No. 10/263,028 filed on Oct. 2, 2002, now abandoned the content of which is relied upon and incorporated herein by reference in its entirety, and the benefit of priority under 35 U.S.C. §120 is hereby claimed. This application claims the benefit of U.S. provisional application Ser. No. 60/326,531 filed Oct. 2, 2001.

FIELD OF THE INVENTION

This invention relates generally to the field of devices for protecting electrical circuits in the event of faults, and more particularly to a device that protects from arc faults and ground faults, which is provided with a manual test feature that permanently denies power to the protected circuit should the test fail.

BACKGROUND OF THE INVENTION

The electrical distribution system is defined to include the circuit breaker, branch circuit conductors, wiring devices, cord sets or extension cords, and electrical conductors within an appliance. A protective device is incorporated in an electrical distribution system for protecting a portion of the system from electrical faults. Ground fault circuit interrupters, also called GFCIs, are one type of protective device that has become quite widely used. They provide a very useful function of disconnecting an electrical power source from the protected portion of the system when a ground fault is detected. Among the more common types of ground faults sensed by known GFCIs are those caused when a person accidentally makes contact with a hot electrical lead and ground. In the absence of a GFCI, life threatening amounts of current could flow through the body of the person.

Arc fault circuit interrupters, also called AFCIs, are another type of protective device but that has been in use more recently. AFCIs disconnect an electrical power source from a load when an arc fault is detected. Among the more common type of arc faults sensed by known AFCIs are those caused by damaged insulation such as from an overdriven staple. This type of arc fault occurs across two conductors in the electrical distribution system such as between the line and neutral conductors or line and ground conductors. The current through this type of fault is not limited by the impedance of the appliance, otherwise known as a load coupled to the electrical distribution system, but rather by the available current from the source voltage established by the impedance of the conductors and terminals between the source of line voltage and the position of the fault, thus effectively across the line, and has been known as a "parallel arc fault." Another type of arc fault sensed by known AFCIs are those caused by a break in the line or neutral conductors of the electrical distribution system, or at a loose terminal at a wiring device within the system. The current through this type of fault is limited by the impedance of the load. Since the fault is in series with the load, this type of fault has also been known as a "series arc fault." In the absence of an AFCI, the sputtering currents associated with an arc fault, whether of the parallel, series or some other type, could heat nearby combustibles and result in fire.

Protective devices are typically provided with line terminals for coupling to the supply voltage of the electrical distribution system, and load terminals coupled to the protected portion of the system and a circuit interrupter for disconnection of the load terminals from the line terminals. The protective device is provided with a sensor for sensing the fault, a detector for establishing if the sensed signal represents a true hazardous fault, as opposed to electrical noise, and a switch responsive to the detector sensor, wherein the circuit interrupter comprising the contacts of a relay or trip mechanism are operated by a solenoid responsive to the switch to disconnect the load terminals from the line terminals. The disconnection is also known as tripping. A power supply may be required to furnish power to the sensor, detector, switch or solenoid.

In one approach that has been considered, a protective device is equipped with a test button which the owner of the protective device is instructed to operate periodically to determine the operating condition of the sensor, the detector, the switch, trip mechanism or relay, or power supply. Any of these components may fail and cause the circuit interrupter to fail to remove power from the load side of the protective device to interrupt the fault. Since the protective device comprises electronic and mechanical components, failure may occur because of normal aging of the electronic components, corrosion of the mechanical parts, poor connections, mechanical wear, mechanical or overload abuse of the protective device in the field, electrical disturbances (e.g., lightning), or for other reasons. Once the test has been manually initiated by operating the test button, the outcome of the test may be indicated mechanically by a button, or visually through a lamp display or pivoting flag that comes into view, or audibly through an annunciator.

In another approach that has been considered, a self-test feature can be added to the protective device for automatic testing as an alternative to a manual test. Once the test has been automatically initiated through the self-test feature, the outcome of the test can be indicated by any of the previously described methods or by the permanent disconnection of the load terminals from the line terminals of the protective device, also known as "lock-out."

Another approach that has been considered is depicted in FIG. 1. GFCI 2 includes line terminals 3 and 5 for coupling to a power source of the electrical distribution system and load terminals 37 and 39 appropriate to the installed location, whether a circuit breaker, receptacle, plug, module, or the like. A ground fault represented by resistor 41 produces an additional current in conductor 4 that is not present in conductor 6. Sensor 12 senses the difference current between conductors 4 and 6 which is then detected by a ground fault detector 14. Detector 14 issues a trip command to an SCR 22 which in turn activates a solenoid 24, which activates a trip mechanism 26 releasing contact armatures 34 and 32, thereby disconnecting power to the load by breaking the circuit from a line hot 4 to a load hot 36 and from a line neutral 6 to a load neutral 38. A contact 10 along with a resistor 8 form a test circuit which introduces a simulated ground fault. When contact 10 is depressed, the additional current on conductor 4 is sensed by sensor 12 as a difference current causing the device to trip. Current flows through resistor 8 for the interval between depression of the contact 10 and the release of contact armatures 34 and 32, which is nominally 25 milliseconds. The device is reset by pressing a reset button 40 which mechanically resets trip mechanism 26. A resistor 20, a Zener 18, and a capacitor 19 form a power supply for GFCI 2.

Referring to FIG. 2, the mechanical layout for the circuit diagram of FIG. 1 is shown in which like elements are like numbered. Trip mechanism 26 is shown in the set state, meaning that contacts 37 and 35 are closed. Contacts 35 and 37 are held closed by action of a trapped make-force spring 46 acting on an escapement 55 on a rest stem 54 to lift a reset latch spring 52 and by interference, an armature 32. Reset latch spring 52 includes a hole 53 and armature 32 includes a hole 33, which holes 33 and 53 permit entry of a tip 58 of reset stem 54. Reset stem 54 is held in place by a block 60. Armature 32 and a printed circuit board (PCB) 56 are mechanically referenced to a housing 48 so that the force in spring 46 is concentrated into armature 32.

Referring to FIG. 3, the mechanism of FIG. 2 is shown in the tripped state. The tripped state occurs when SCR 22 activates a magnetic field in solenoid 24, which in turn pulls in plunger 23 to displace reset latch spring 52. Displacing reset latch spring 52 allows a flat portion 55 to clear the latch spring 53 interference, which then releases the interference between latch spring 52 and armature 32. Armature 32 has a memory which returns armature 32 to a resting position against solenoid 24, opening contacts 35 and 37 and disconnecting power to the load.

Protective devices have been located in an electrical distribution system in a variety of conventional device housings such as but not limited to circuit breakers typically installed inside a panel at the service entrance having an interrupting contact that disconnects the load in response to sustained overcurrent, receptacle outlets or snap switches typically installed inside a wall box, portable housings typically installed in plugs or connectors or as protective modules within appliances. Constructional requirements for the different device housings differ. Some differences arise from the pertinent UL (Underwriters Laboratories) safety standards, for example, UL standard 943 for GFCIs and UL standard 1699 for AFCIs. Unlike circuit breaker and receptacle devices, portable devices are susceptible to a poor connection between the receptacle and neutral plug blade. Therefore, only portable devices must continue to afford provide protection or interrupt load side power due to neutral supply conductor failure. This requirement for the portable protective device has often been accomplished using a relay with normally open contacts serving as the circuit interrupter. Other differences arise from the nature of the housing itself, wherein protective devices that are housed in a circuit breaker and that require a power supply most conveniently derive power for the supply power from the load side of the circuit interrupter.

Some of the protective devices discussed above employ complicated circuitry that is both expensive and subject to failure. Some of the protective devices that have been considered by designers may include complicated mechanical linkages. Some of the devices under consideration may require a power supply for powering the protective circuitry, the power being derived from the line terminals of the protective device. Inconveniently, the protective device is housed in a circuit breaker enclosure and the circuit breaker derives power from the load side terminals of the protective device. What is needed is a protective device that addresses the needs described above.

SUMMARY OF THE INVENTION

Briefly stated, a protective device includes a test button for enabling a test signal for testing an operating condition of at least one of the device components, such as the sensor, detector, switch, solenoid and trip mechanism. The test button also enables a current through a resistor body which is affixed to a stationary part of the device. The resistor body keeps a lockout spring under tension. Failure of the test signal to operate the trip mechanism within a predetermined time interval causes the resistor body conducting the current to reach a predetermined temperature, wherein the resistor body ceases to hold a lockout spring, thereby permitting the lockout spring to move to a position which causes the set of interrupting contacts to remain permanently in a disconnected position.

The present invention denies power to the protected side of the device when there is a loss of protective function. Manual operation of the device's test button enables an electrical test signal for testing the device. At the same time, a current is initiated through a resistor body in an embodiment, or fusible component in an alternate embodiment. If the test signal does not cause the interrupting contacts to disconnect within the expected time interval, the ongoing current through the resistor body causes solder connections to melt and the resistor body to physically dislodge to a second position under bias from a spring, the motion of resistor and spring resulting in the interrupting contacts of the protective device remaining permanently in the disconnected position. In an alternate embodiment, a fusible resistor burns open and ceases to conduct electrical current, resulting in the interrupting contacts of the protective device remaining permanently in the disconnected position.

According to one embodiment of the invention, the present invention is directed to a protective device that includes a plurality of line terminals configured to be connected to an electrical distribution system, and a plurality of load terminals configured to be connected to at least one load. The device includes a fault detection circuit coupled to the plurality of line terminals and the plurality of load terminals. The fault detection circuit is configured to detect at least one fault condition. A power interruption circuit coupled to the fault detection circuit, the power interruption circuit including a set of movable contacts configured to decouple the plurality of line terminals from the plurality of load terminals in response to the fault detection circuit detecting the at least one fault condition. A reset mechanism is coupled to the power interruption circuit and configured to actuate the movable contacts to re-couple the plurality of line terminals to the plurality of load terminals. A lock-out mechanism is coupled to the reset mechanism. The lockout mechanism is configured to disable the reset mechanism in a lock-out state. A test circuit is coupled to the fault detection circuit and the lock-out mechanism. The test circuit is configured to provide a simulated fault signal to the fault detection circuit. The test circuit is configured to drive the lock-out mechanism from an unlocked state to the lock-out state if the fault detection circuit and/or power interruption circuit fails to respond to the simulated fault signal within a predetermined period of time.

According to another embodiment of the invention, the present invention is directed to a protective device that includes a plurality of line terminals configured to be connected to an electrical distribution system, and a plurality of load terminals configured to be connected to at least one load. The device includes a fault detection circuit coupled to the plurality of line terminals and the plurality of load terminals. The fault detection circuit is configured to detect at least one fault condition. A power interruption circuit coupled to the fault detection circuit, the power interruption circuit including a set of movable contacts configured to decouple the plurality of line terminals from the plurality of load terminals in response to the fault detection circuit detecting the at least one fault condition. A reset mechanism is coupled to the power interruption circuit and configured to actuate the movable contacts to re-couple the plurality of line terminals to the plurality of load terminals. A lock-out mechanism is coupled to the reset mechanism. The lockout mechanism is configured to disable the reset mechanism in a lock-out state. The lockout mechanism includes a spring mechanism configured to drive the reset mechanism into a lock-out state, and a fuse element coupled to the spring mechanism to prevent the spring mechanism from moving in an unlocked state. A test circuit is coupled to the fault detection circuit and the lock-out mechanism. The test circuit is configured to provide a simulated fault signal to the fault detection circuit. The test circuit is configured to open the fuse element to thereby drive the lock-out mechanism from the unlocked state to the lock-out state if the fault detection circuit and/or power interruption circuit fails to respond to the simulated fault signal within a predetermined period of time.

According to one embodiment of the invention, the present invention is directed to a protective device that includes a plurality of line terminals configured to be connected to an electrical distribution system, and a plurality of load terminals configured to be connected to at least one load. The device includes a fault detection circuit coupled to the plurality of line terminals and the plurality of load terminals. The fault detection circuit is configured to detect at least one fault condition. A power interruption circuit coupled to the fault detection circuit, the power interruption circuit including a set of movable contacts configured to decouple the plurality of line terminals from the plurality of load terminals in response to the fault detection circuit detecting the at least one fault condition. A reset mechanism is coupled to the power interruption circuit and configured to actuate the movable contacts to re-couple the plurality of line terminals to the plurality of load terminals. A lock-out mechanism is coupled to the reset mechanism. The lockout mechanism is configured to disable the reset mechanism in a lock-out state. A test circuit includes a first circuit element coupled to the fault detection circuit and a second circuit element coupled to the lock-out mechanism, the first circuit element being configured to provide a simulated fault signal to the fault detection circuit, the second circuit element being configured to drive the lock-out mechanism from an unlocked state to the lock-out state if the fault detection circuit and/or power interruption circuit fails to respond to the simulated fault signal within a predetermined period of time.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENT

Figure 1:
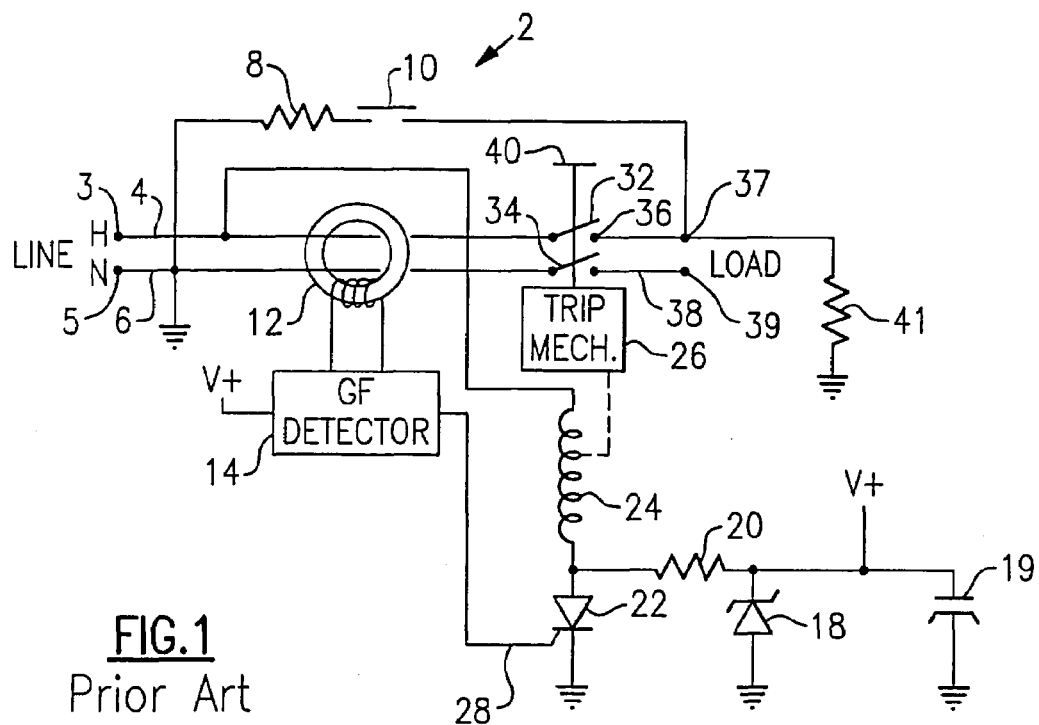
FIG. 1 shows a circuit diagram for a ground fault circuit interrupter (GFCI) according to the prior art.
Figure 2:
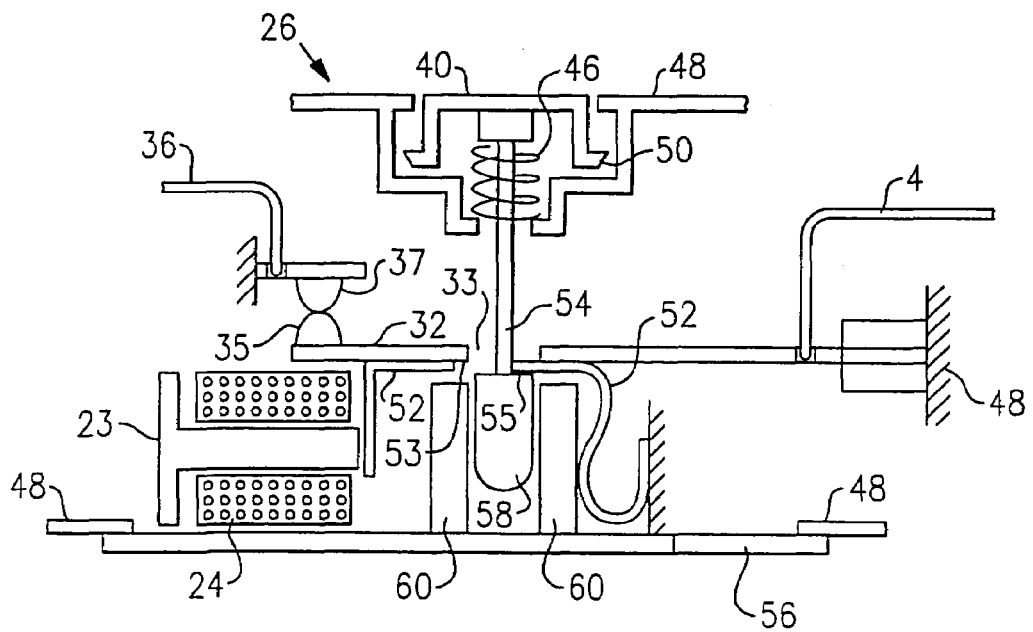
FIG. 2 shows a partial sectional view of a prior art mechanical implementation of the schematic of FIG. 1.
Figure 3:
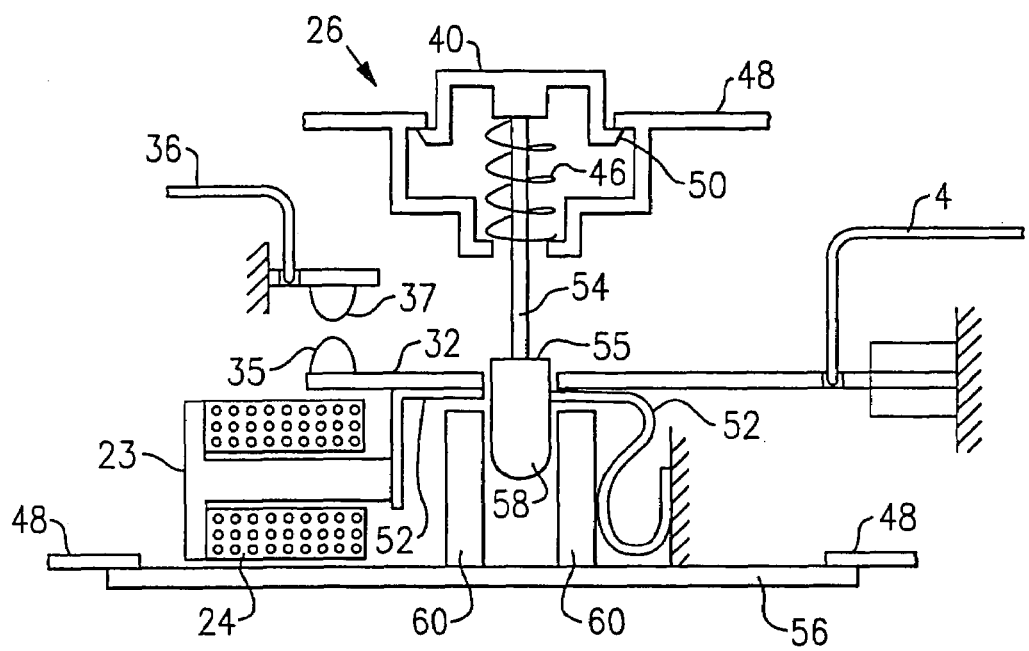
FIG. 3 shows the mechanical implementation of FIG. 2 in the tripped state.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the GFCI of the present invention is shown in FIGS. 4–13 and is designated generally throughout by reference numeral 2.

Figure 4:
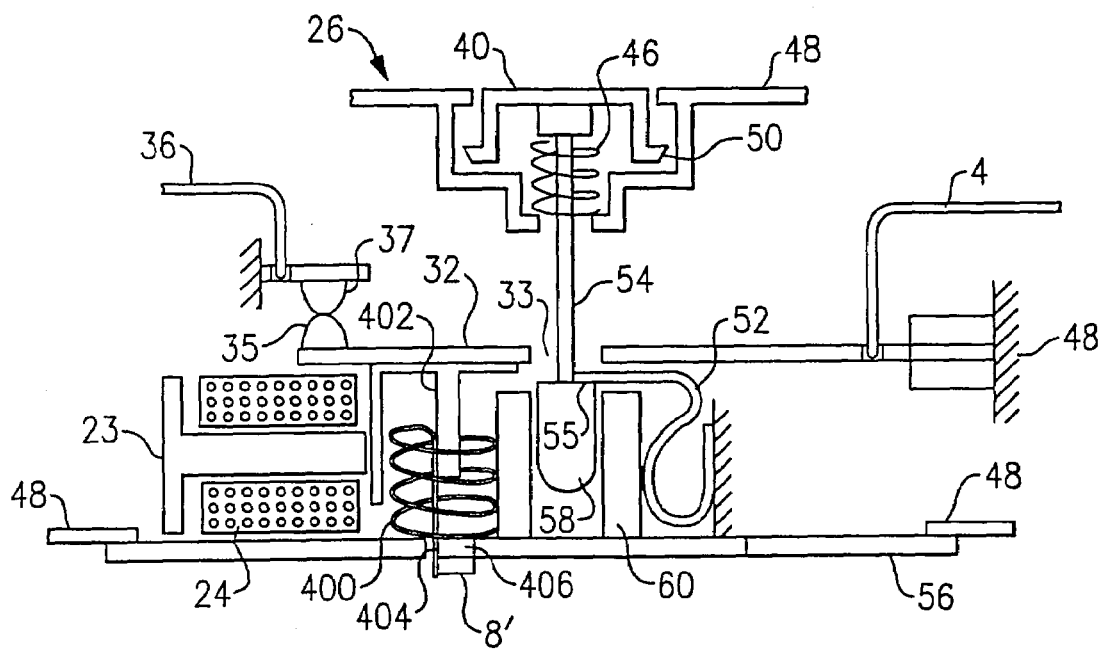
FIG. 4 shows a partial sectional view of a mechanical implementation of an embodiment of the invention.

Referring to FIG. 4, a partial sectional view of a mechanical implementation of an embodiment of the invention is shown. A resistor 8', shown schematically in FIG. 1 as resistor 8, is designed to withstand self-heating that results from each depression of contact 10, which causes current to flow through resistor 8' for the expected trip time of the GFCI. For example, resistor 8' for a 6 mA GFCI coupled to a 120 VAC supply is required by UL to be 15 KOhms, which dissipates nominally 0.96 Watts during each trip time interval. In particular, resistor 8' must survive several thousand trip time intervals accomplished by depressing contact 10 and reset button 40 alternately. During normal operation of GFCI 2, resistor 8' is physically positioned to restrain lockout spring 400. Resistor 8' is preferably mounted and soldered so that the body of resistor 8' impedes movement of lockout spring 400.

Figure 5:
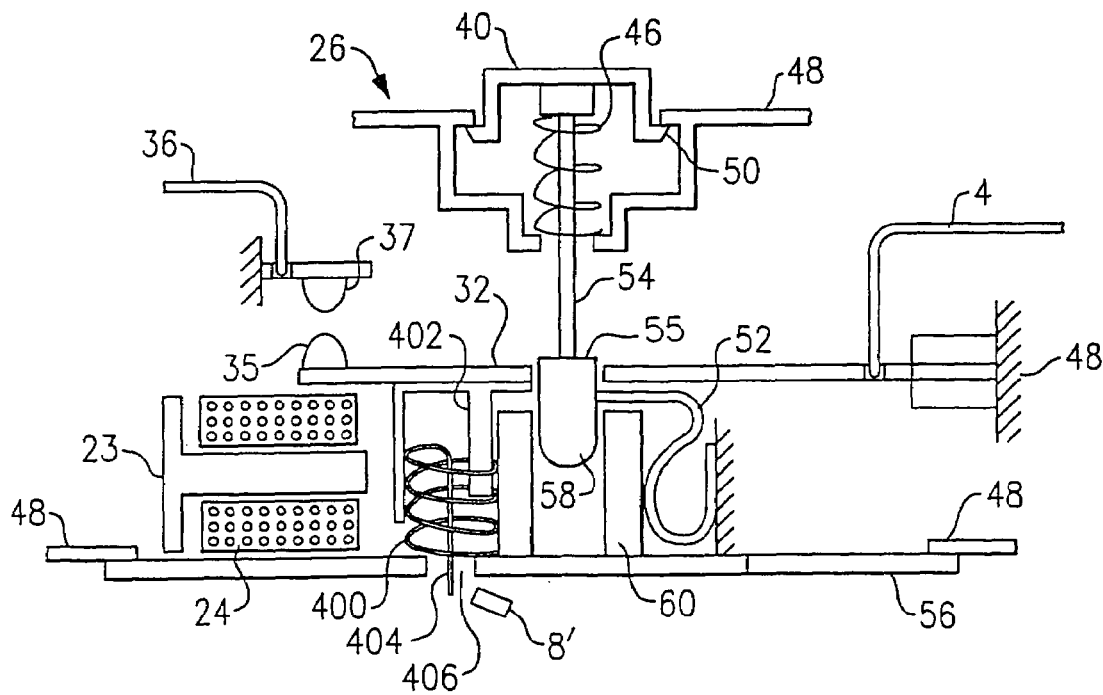
FIG. 5 shows a partial sectional view of the mechanical implementation of FIG. 4 is shown in the lock-out position.

Referring to FIG. 5, a partial sectional view of the mechanical implementation of FIG. 4 is shown in the lock-out position. The GFCI 2 has failed in some manner such that the trip time in response to depressing contact 10 is greater than the expected interval including failure of GFCI 2 to trip altogether. Examples of failure modes include a defective sensor 12, and for a sensor 12 comprising a transformer, open or shorted turns. The detector 14, typically composed of electronic components, may have poor solder connections or components that have reached end of life. The SCR 22 may short circuit either due to reaching end of life or due to a voltage surge from a lightning storm, thereby causing continuous current through solenoid 24 which burns open through over activation, or, alternatively, SCR 22 may open circuit. The mechanical components associated with trip mechanism 26 may become immobilized from wear or corrosion. The power supply, if provided, may fail to deliver power in accordance with the design such that sensor 12, detector 14, SCR 22, or solenoid 24 are non-operative.

When failure of GFCI 2 occurs, the current through resistor 8' flows for the time that contact 10 is manually depressed, on the order of at least seconds, which is two orders of magnitude longer than if the trip mechanism 26 were to operate in response to depressing contact 10. Resistor 8', which is preferably coupled electrically to GFCI 2 through solder, heats from the current and melts the solder. Resistor 8', no longer restrained by the solder, or in an alternative embodiment by an adhesive, is physically dislodged by the bias of lockout spring 400. Force is then applied by an end 404 of lock-out spring 400 against a feature on the reset latch spring 52, for example, a tab 402. The force in lockout spring 400 is greater than the force in reset latch spring 52. As previously described, reset latch spring 52 is displaced allowing a flat portion 55 to clear the latch spring 53 interference, which then releases the interference between reset latch spring 52 and armature 32. Armature 32 has a memory which returns armature 32 to a resting position against solenoid 24, opening contacts 35 and 37 and disconnecting power to the load. Thus when the GFCI 2 is operational, the tripping mechanism 26 is able to operate, and the armatures 32 and 34 disconnect when plunger 23 applies force to reset latch spring 52. If GFCI 2 is not operative, lockout spring 400 applies force to reset latch spring 52, likewise causing armatures 32 and 34 to disconnect. When GFCI 2 is tripped under the influence of lockout spring 400, armatures 32 and 34 are permanently disconnected irrespective of depressing contact 10 or reset button 40 or any further movement in plunger 23. Thus resistor 8' is integral to the lock-out feature of the present invention.

Figure 6:
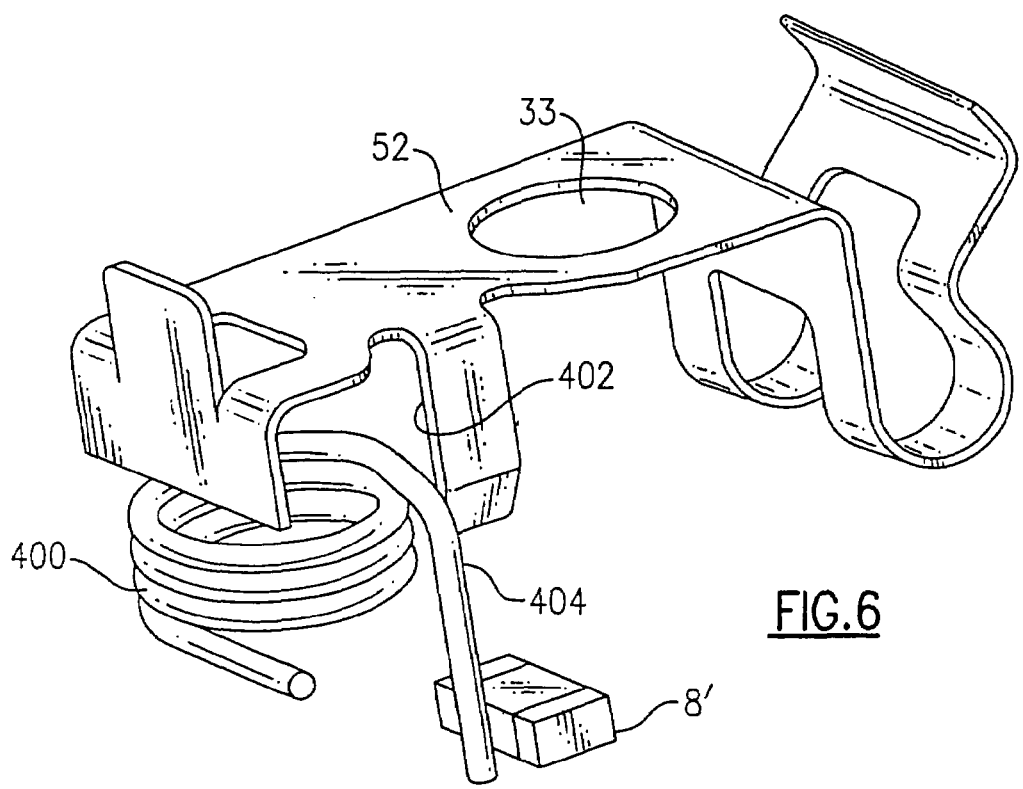
FIG. 6 shows a three-dimensional view of some of the components of the embodiment of FIG. 4.

Referring to FIG. 6, components of the embodiment of FIG. 4 are shown in a three-dimensional view including lockout spring 400, end 404, resistor 8', and latch spring 52. Spring 404 is preferably affixed to the same structure as resistor 8'.

Figure 7:
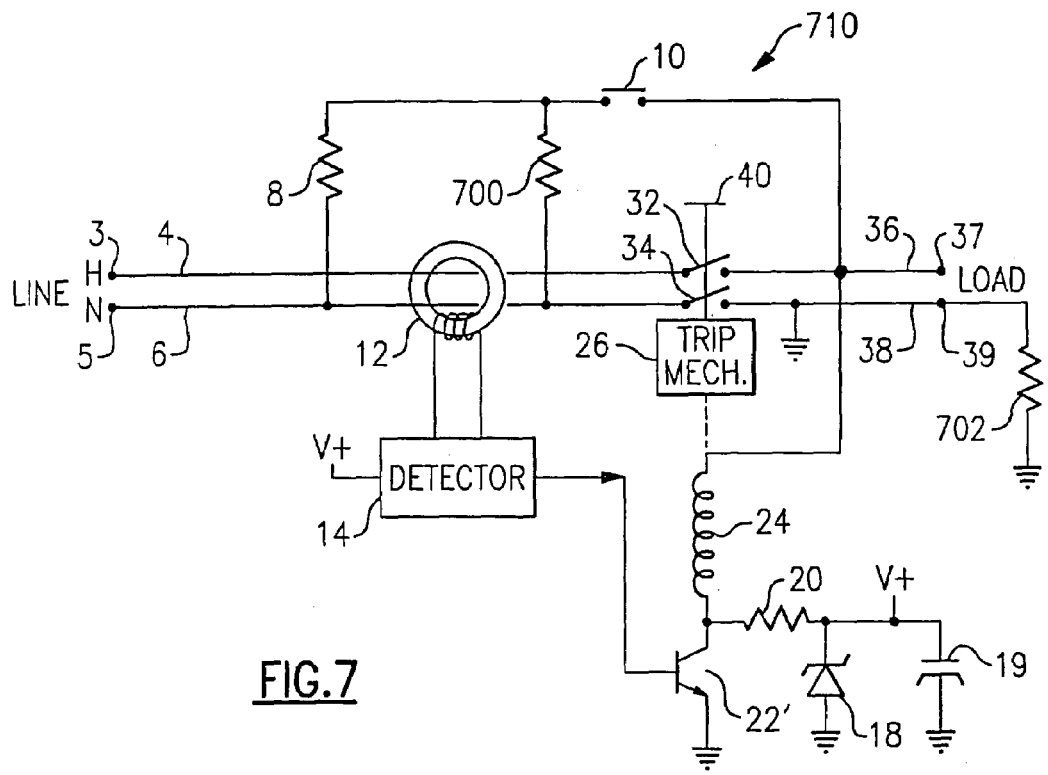
FIG. 7 shows a protective device according to an embodiment of the invention.

Referring to FIG. 7, a protective device 710 shows a resistor 700 which is then used as the resistor body which constrains spring 400. There are other ground fault circuit interrupters whose trip thresholds are greater than 6 milliamperes intended for a variety of supply voltages or phase configurations, and intended for personnel protection or fire prevention. Alternate trip levels typically include 30 milliamperes in the U.S. or Europe, or 300 or 500 milliamperes in Europe, to which the invention as described applies. For devices where the current through resistor 8 may produce insufficient heat during the anticipated duration that contact 10 is manually depressed to melt the solder, resistor 8 can be supplemented by a resistor 700 in parallel with resistor 8 which connects to line 6 on the other side of sensor 12 from where resistor 8 connects to line 6. Currents through resistors 8 and 700 are enabled by depressing contact 10. Resistor 8 generates a simulated test signal comprising a difference current to test GFCI 2 as previously described. Resistor 700 is coupled so as to conduct common mode current but no difference current. Since the current through resistor 700 does not influence the amount of simulated test current required by UL, which is set by the value of resistor 8, the value of resistor 700 can be whatever value is convenient for producing sufficient heat in resistor 700 when contact 10 is manually depressed to release lockout spring 400 when GFCI 2 is not operational. FIG. 7 also shows how the lockout function is unaffected by whether the power supply for the GFCI comprising resistor 20, Zener 18, and capacitor 19 are coupled to the load side of armatures 32 and 34. Load side power derivation may be convenient for GFCIs or protective devices housed in a circuit breaker. FIG. 7 also shows how SCR 22 can be replaced by a transistor 22', with either device comprising a switch for controlling solenoid 24.

Figure 8:
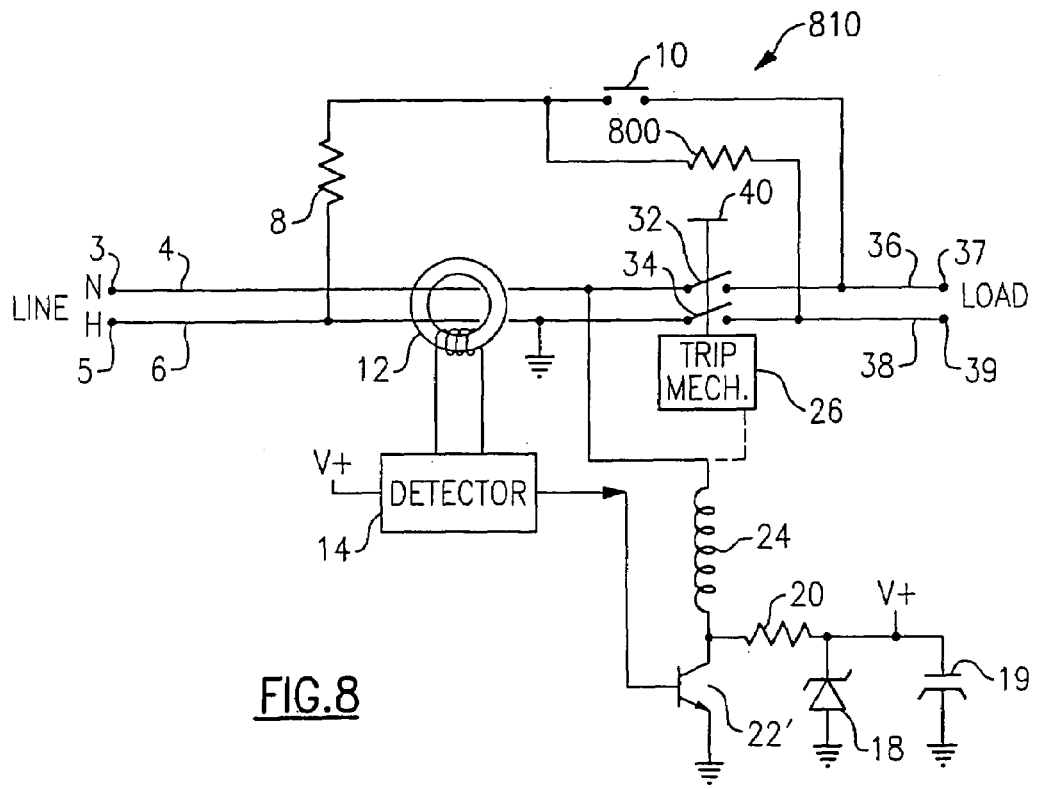
FIG. 8 shows a protective device according to an embodiment of the invention.

Referring to FIG. 8, a protective device 810 which is an alternate embodiment to FIG. 7 shows a resistor 800 which serves the same function as resistor 700 in FIG. 7 but is coupled to the load side of the interrupting contacts, i.e., contact armatures 32, 34. This may be important for 6 milliampere GFCI receptacles and portables where the hot and neutral supply conductors are inadvertently transposed by the installer, wherein the hot side of the supply voltage from the electrical distribution system is connected to line terminal 5. If the armatures 32 and 34 in FIG. 7 are disconnected in response to a fault current, a hazardous current may yet flow through resistors 8 and 700 through ground fault 702 when contact 10 is depressed. However, if armatures 32 and 34 in FIG. 8 are disconnected, current flows through resistor 8 but not through resistor 800, which is not a problem because the current flow through resistor 8 alone has already been determined to be non-hazardous.

Figure 9:
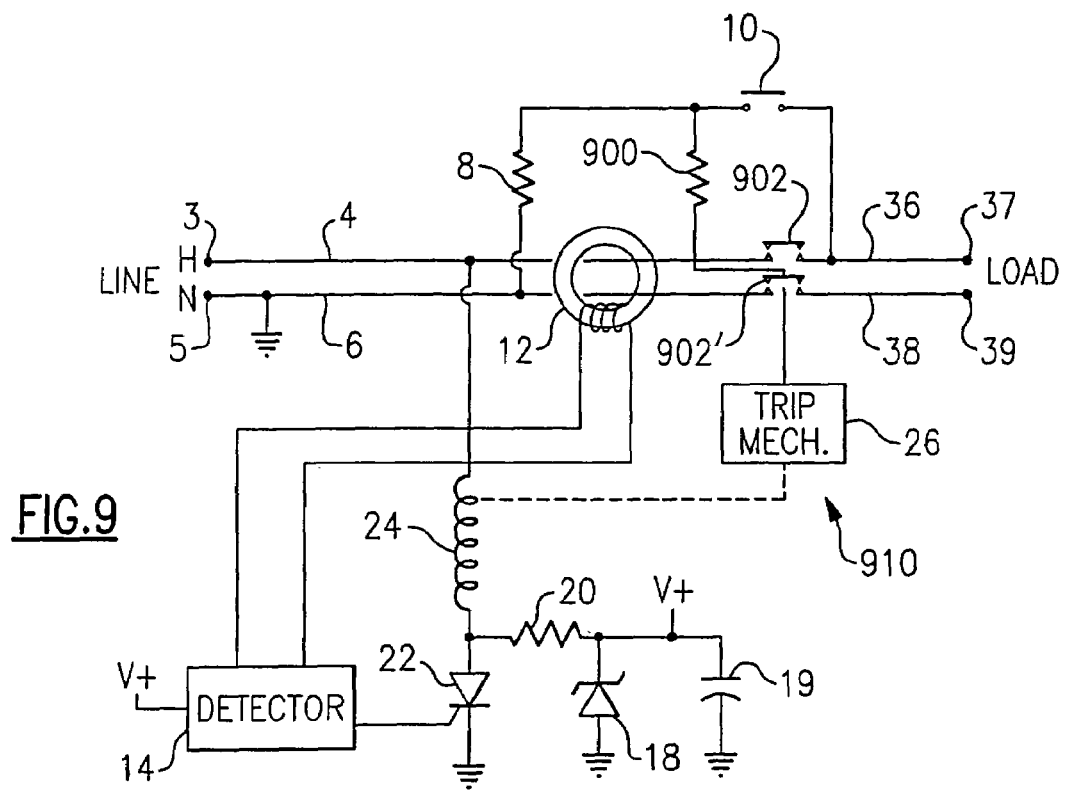
FIG. 9 shows a protective device according to an embodiment of the invention.

Referring to FIG. 9, a protective device 910 which is an alternative embodiment to FIG. 8 is shown in which the trip mechanism comprises one or more bus bars. Reference is made to U.S. Pat. No. 5,510,760, which is incorporated herein by reference as though fully set forth in its entirety, for a more detailed explanation of the bus bar arrangement. Resistor 900 serves the same function as resistor 800 in FIG. 8 except that resistor 900 is coupled to moveable bus bar 902'. For receptacle housings it is possible for the installer to mis-wire a GFCI such that the supply voltage is connected to load terminals 37 and 39, which would cause resistor 800 (FIG. 8) to melt solder when contact 10 is depressed, even when device 810 is in good working condition, i.e., operational. The problem is alleviated in the embodiment of FIG. 9 whereby resistor 900 melts solder only when bus bar 902' remains connected when contact 10 is depressed, that is, when device 910 is non-operational. Mis-wiring thus does not cause a permanent lock-out of device 910.

Figure 10:
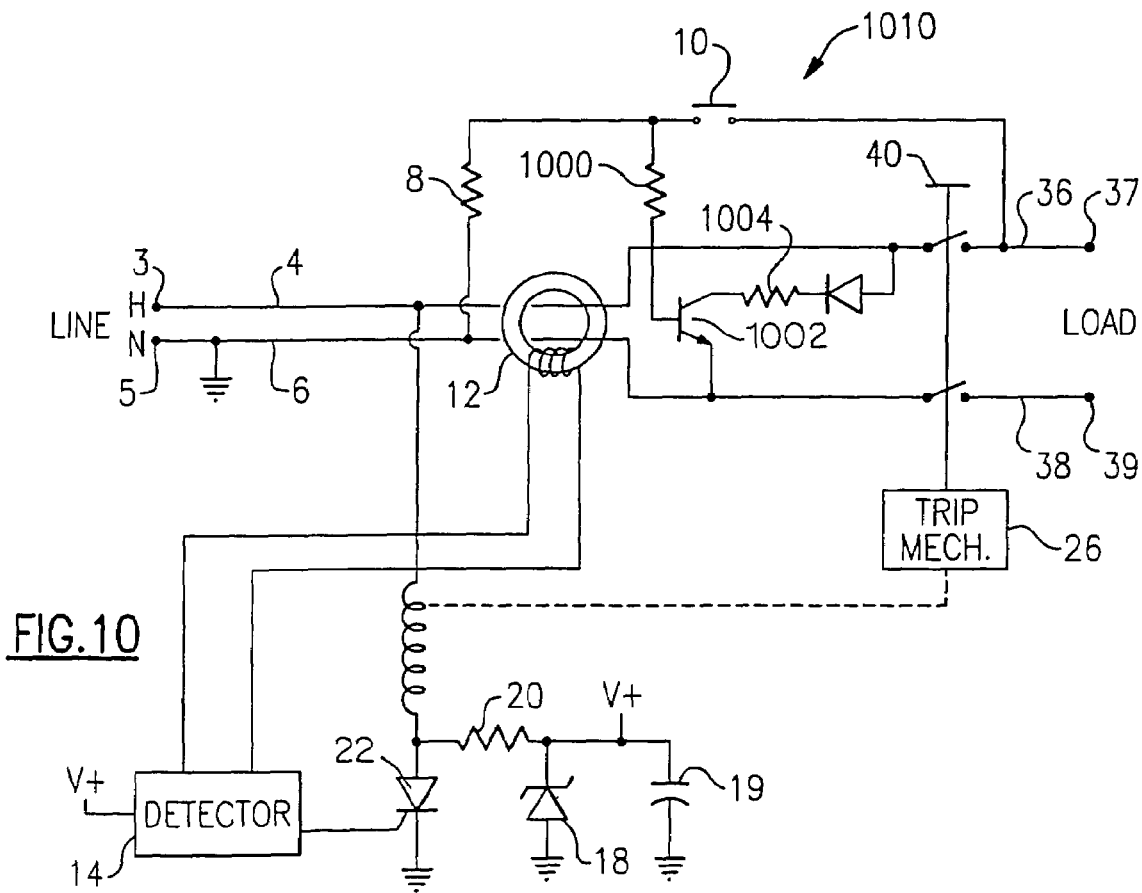
FIG. 10 shows a protective device according to an embodiment of the invention.

Referring to FIG. 10, a protective device 1010 which is an alternate embodiment to FIG. 7 is shown, wherein contact 10 enables a current through resistor 8, as previously described, and a second current through a resistor 1000 in which the second current is preferably less than a tenth of the current through resistor 8. The second current depends on an interface circuit such as a transistor switch 1002. Transistor switch 1002 causes current to flow through a resistor 1004 of identical function to resistor 700 described in FIG. 7, i.e., resistor 1004 is normally in such a position as to leave spring 400 (FIG. 6) under tension, but when resistor 1004 heats up from the current through it sufficient to dislodge the solder affixing resistor 1004 to a fixed reference surface, the dislodgement of resistor 1004 releases spring 400.

FIG. 10 shows an alternative to FIG. 8 wherein a hazardous current does not occur when the hot and neutral supply conductors are inadvertently transposed as described in FIG. 8. In addition, FIG. 10 shows another remedy for the issue described in the FIG. 9 embodiment wherein resistor 1004 melts solder only if protective device 1010 is non-operational and not when protective device 1010 is mis-wired.

Figure 11:
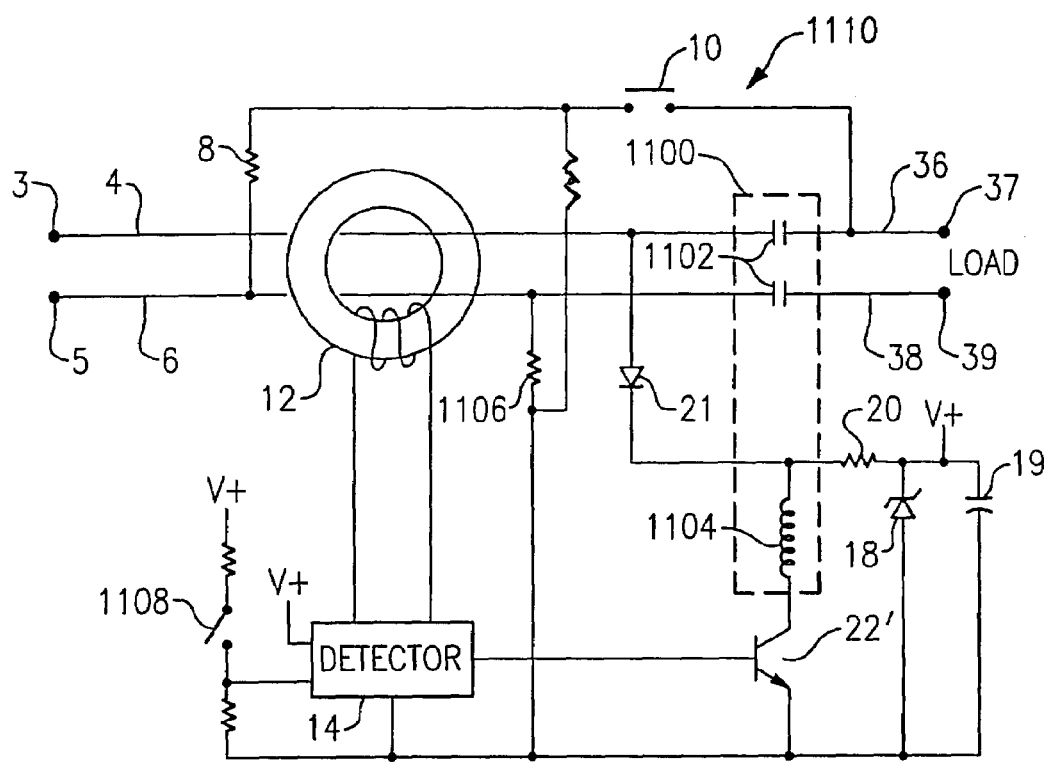
FIG. 11 shows a protective device according to an embodiment of the invention.

Referring to FIG. 11, a protective device such as GFCI 1110 according to an alternate embodiment is shown, wherein the so called mouse trap mechanism, i.e., the tripping mechanism of the GFCI of FIGS. 1–5, is replaced by a relay 1100 having normally open contacts 1102 that connect or disconnect line terminals 3 and 5 from load terminals 37 and 39 respectively, and a solenoid 1104, which is designed to carry current when contacts 1102 of GFCI 1110 are connected, a construction that is common to, but not limited to, portable GFCI devices. Solenoid 1104 is designed to conduct current for the unlimited duration that GFCI 1110 is in use, wherein solenoid 1104 is not susceptible to burn out caused by over-activation as previously described with respect to solenoid 24. A fusible element 1106 is in series with the solenoid and is designed to carry the continuous current through solenoid 1104 when transistor 22' is closed. Contact 10 enables current through resistor 8 which produces a difference current as previously described, and a common mode current, which, if the device is non-operational, enables a lock-out feature. The common mode current, which is greater than the solenoid current, is conducted through fusible element 1106.

If GFCI 1110 is operational, the load side is disconnected from the line side, causing the device to trip and resistor 8 and common mode currents to stop flowing even if contact 10 continues to be manually depressed. Fusible resistor 1106 must survive several thousand cycles of common mode current exposures from alternately depressing contact 10 to trip GFCI 1110 and switch 1108 to electronically reset GFCI 1110. The duration of each common mode current exposure is the expected time that GFCI 1110 requires for tripping after contact 10 has been depressed. If GFCI 1110 fails in some manner such that the trip time in response to depressing contact 10 is greater than the expected interval including the failure of GFCI 1110 to trip altogether, fusible element 1106 burns to an open circuit, permanently eliminating current through solenoid 1104 and rendering interrupting contacts 1102 in a permanently disconnected position. Fusible element 1106 can include a resistor.

Figure 12:
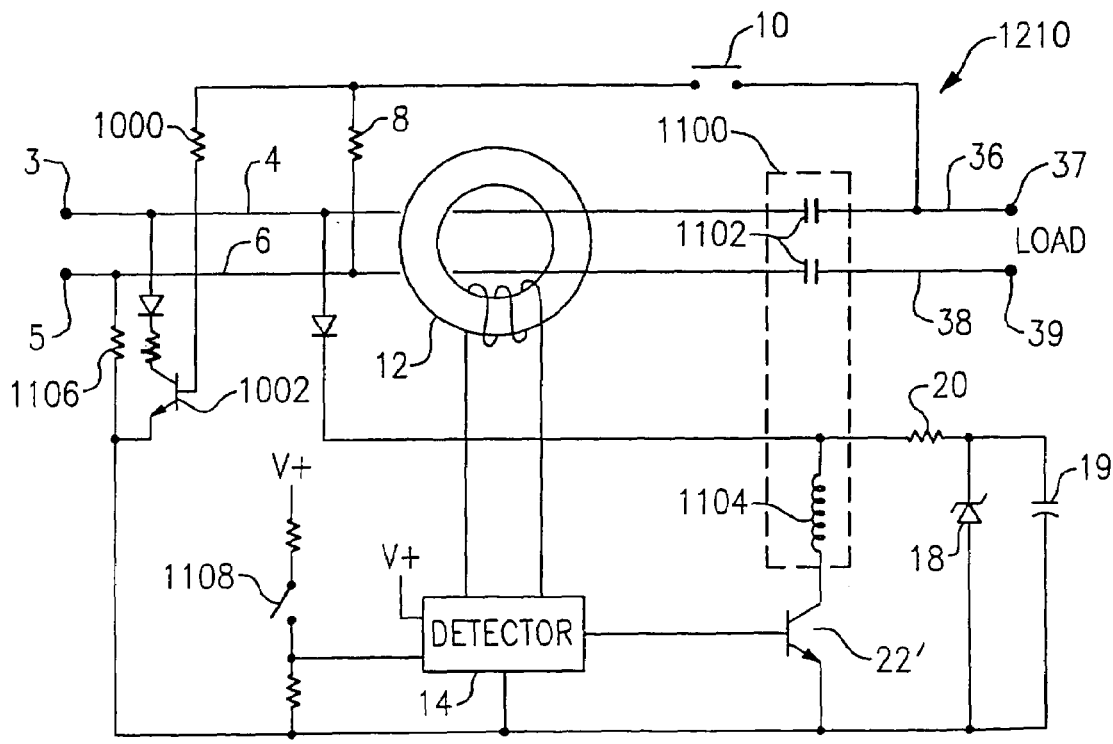
FIG. 12 shows a protective device according to an embodiment of the invention.

Referring to FIG. 12, elements of the circuit diagram of FIG. 11 are combined with elements of the circuit diagram of FIG. 8 in a protective device 1210, wherein components having like functions bear like numbers. The concept shown in FIG. 11 is thus combined with the embodiment of FIG. 8 to protect against the inadvertent transposing of the hot and neutral supply conductors to terminals 3 and 5 from the electrical distribution system. For protective devices not equipped with a resistor 8, the value of resistor 1000 can be chosen so that current passing there through is less than 0.5 mA, which limit has been identified to be the perception level for humans.

Figure 13:
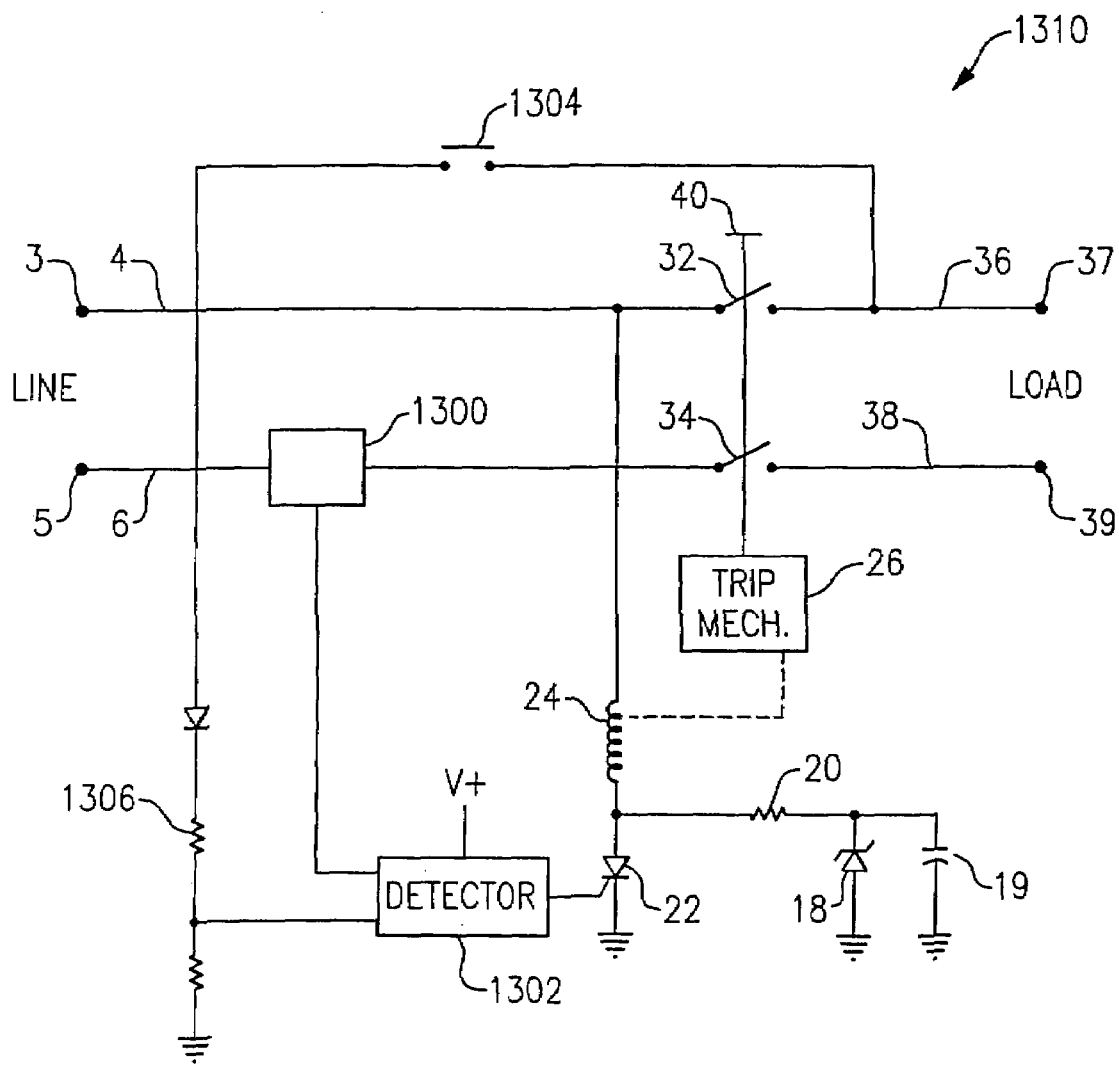
FIG. 13 shows a protective device according to an embodiment of the invention.

Referring to FIG. 13, an alternate embodiment is shown in which the preceding concepts are applied to a general protective device 1310 representative of the class of general protective devices including AFCIs that require a contact 10 but that are not necessarily equipped with a GFCI or a sensor capable of sensing difference current. Reference is made to U.S. Pat. No. 6,421,214, which is incorporated herein by reference as though fully set forth in its entirety, for a more detailed explanation of protective device 1310. Components having like functions bear like numbers. Sensor 1300 is similar to sensor 12 but may be a current sensor or shunt for sensing load current through either conductor 6 or through conductor 4. A detector 1302 is similar to detector 14 (FIG. 1) but senses particular signatures in the load current as has been demonstrated in other patent applications as a method of identifying arc faults. A contact 1304 is similar to contact 10 (FIG. 1), which initiates a test of protective device 1310 when depressed. The test signal can be controlled by detector 1302 to test sensor 1300, detector 1302, switch 22, and trip mechanism 26. A resistor 1306 is similar to resistor 700 (FIG. 7) which is affixed to a fixed reference surface. If armatures 32 and 34 fail to operate due to a malfunction of protective device 1310, the longer duration of current through resistor 1306 causes sufficient self-heating of resistor 1306 to melt the solder affixing resistor 1306 to the fixed reference surface, wherein resistor 1306 is dislodged due to force exerted by lockout spring 400 (FIG. 4), wherein lockout spring 400 causes armatures 32 and 34 to be permanently disconnected.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A protective device including a plurality of line terminals configured to be connected to an electrical distribution system and a plurality of load terminals configured to be connected to at least one load, comprising:
   a fault detection circuit coupled to the plurality of line terminals and the plurality of load terminals, the fault detection circuit being configured to detect at least one fault condition;
   a power interruption circuit coupled to the fault detection circuit, the power interruption circuit including a set of movable contacts configured to decouple the plurality of line terminals from the plurality of load terminals in response to the fault detection circuit detecting the at least one fault condition;
   a reset mechanism coupled to the power interruption circuit and configured to actuate the movable contacts to re-couple the plurality of line terminals to the plurality of load terminals;
   a lock-out mechanism coupled to the reset mechanism, the lockout mechanism being configured to disable the reset mechanism in a lock-out state; and
   a test circuit coupled to the fault detection circuit and the lock-out mechanism, the test circuit being configured to provide a simulated fault signal to the fault detection circuit in response to a user stimulus, the test circuit being configured to drive the lock-out mechanism from an unlocked state to the lock-out state if the fault detection circuit and/or power interruption circuit fails to respond to the simulated fault signal within a pre-determined period of time.

2. The device of claim 1, wherein the fault detection circuit includes a ground fault detection circuit.

3. The device of claim 1, wherein the fault detection circuit includes an arc fault detection circuit.

4. The device of claim 1, wherein the reset mechanism further comprises:
   a reset button; and
   a linkage mechanism coupled to the reset button, the linkage mechanism being configured to engage a portion of the movable contacts in a coupled state, the set of movable contacts being engaged to thereby couple the plurality of line terminals to the plurality of load terminals, the linkage mechanism also being configured to disengage the portion of the movable contacts in a decoupled state, such that the plurality of line terminals are decoupled from the plurality of load terminals.

5. The device of claim 4, wherein the reset mechanism further comprises a latch coupled to the linkage mechanism, the latch being configured to move the linkage mechanism from the coupled state to the decoupled state in response to a stimulus from the power interruption circuit.

6. The device of claim 5, wherein the latch is configured to move the linkage form the uncoupled state to the coupled state in response to a user stimulus of the reset button, when the test circuit is in the unlocked state.

7. The device of claim 5, wherein the latch cannot move the linkage from the uncoupled state to the coupled state in response to a user stimulus of the reset button, when the test circuit is in the lock-out state.

8. The device of claim 5, wherein the latch is coupled to a fuse mechanism, the fuse mechanism being closed in the unlocked state and open in the lock-out state, the fuse mechanism being configured to prevent the latch from latching the linkage mechanism when the test circuit is in the lock-out state.

9. The device of claim 5, wherein the lockout mechanism further comprises:
a spring mechanism configured to move the latch into the lock-out state; and
a fuse mechanism coupled to the spring mechanism, the fuse mechanism being configured to prevent the spring mechanism from moving the latch into the lock-out state, the fuse mechanism being configured to fail if the fault detection circuit and/or power interruption circuit fails to respond to the simulated fault signal within the predetermined period of time.

10. The device of claim 9, wherein the fuse mechanism includes a resistor soldered in a position corresponding to the unlocked state, the test circuit being configured to transmit current through the resistor when providing the simulated fault signal, the current being configured to cause the solder to fail after the predetermined period of time elapses, to thereby allow the spring mechanism to move the latch into the lock-out state.

11. The device of claim 9, wherein the fuse mechanism includes a resistor disposed in a position corresponding to the unlocked state by an adhesive, the test circuit being configured to transmit current through the resistor when providing the simulated fault signal, the current being configured to cause the adhesive to fail after the predetermined period of time elapses, to thereby allow the spring mechanism to move the latch into the lock-out state.

12. The device of claim 1, wherein the lock-out mechanism further comprises:
a spring mechanism configured to drive the reset mechanism into the lock-out state; and
a fuse mechanism coupled to the spring mechanism, the fuse mechanism being configured to prevent the spring mechanism from driving the lockout mechanism into the lock-out state, the fuse mechanism being configured to fail if the fault detection circuit and/or power interruption circuit fails to respond to the simulated fault signal within the predetermined period of time.

13. The device of claim 12, wherein the fuse mechanism includes a resistor soldered in a position corresponding to the unlocked state, the test circuit being configured to transmit an electric current through the resistor when providing the simulated fault signal, the electric current being configured to cause the solder to fail after the predetermined period of time elapses, to thereby allow the spring mechanism to move the lockout mechanism into the lock-out state.

14. The device of claim 12, wherein the fuse mechanism includes a resistor disposed in a position corresponding to the unlocked state by an adhesive, the test circuit being configured to transmit current through the resistor when providing the simulated fault signal, the current being configured to cause the adhesive to fail after the predetermined period of time elapses, to thereby allow the spring mechanism to move the lockout mechanism into the lock-out state.

15. The device of claim 1, wherein the lock-out mechanism includes a resistor coupled to the reset mechanism by a material, the material being configured to fail when the predetermined period of time elapses to decouple the resistor from the reset mechanism, the reset mechanism being driven into the lock-out state.

16. The device of claim 15, wherein the material includes solder.

17. The device of claim 15, wherein the material includes an adhesive.

18. The device of claim 1, wherein the test circuit further comprises:
a test switch responsive to a user stimulus;
a first circuit element coupled to the test button, the first circuit element configured to generate the at least one fault condition in response to the test switch being in a closed position; and
a second circuit element coupled to the test switch, the second circuit element being configured to drive the test circuit from the unlocked state to the lock-out state if the fault detection circuit and/or the power interruption circuit fail to respond to the at least one fault condition within the predetermined time period.

19. The device of claim 18, wherein the second circuit element includes a fuse mechanism that is closed in the unlocked state and open in the lock-out state.

20. The device of claim 18, wherein the second circuit element includes a resistor coupled to the lockout mechanism by solder, the solder being configured to fail after the predetermined time elapses, decoupling the resistor from the lock-out mechanism, driving the test circuit from the unlocked state to the lock-out state.

21. The device of claim 18, wherein the first circuit element produces a differential current when the test switch is closed, the differential current simulating the at least one fault condition, the second circuit element generating substantially no differential current.

22. The device of claim 18, wherein the second circuit element includes a resistor coupled to the reset mechanism by a material, the material being configured to fail when the predetermined period of time elapses to decouple the resistor from the reset mechanism, the reset mechanism being driven into the lock-out state.

23. The device of claim 22, wherein the lock-out mechanism further comprises:
a spring mechanism configured to drive the reset mechanism into the lock-out state; and
the resistor coupled to the spring mechanism, the resistor being configured to prevent the spring mechanism from driving the lockout mechanism into the lock-out state, the resistor being configured to fail if the fault detection circuit and/or power interruption circuit fails to respond to the simulated fault signal within the predetermined period of time.

24. The device of claim 18, wherein the second circuit element further comprises:
- a first resistor coupled to the test switch;
- a transistor including a base, emitter, and collector terminals, the base terminal being coupled to the first resistor; and
- a second resistor coupled to the collector terminal and soldered to the lockout mechanism, the solder being configured to fail after the predetermined time elapses, decoupling the second resistor from the lock-out mechanism, driving the test circuit from the unlocked state to the lock-out state.

25. The device of claim 1, wherein the power interruption circuit includes a spring loaded mechanism configured to actuate the set of movable contacts from a coupled state to an uncoupled state.

26. The device of claim 25, wherein the reset mechanism drives the set of movable contacts from the uncoupled state to the coupled state in the unlocked state, but cannot drive the set of movable contacts from the uncoupled state to the coupled state in the lock-out state.

27. The device of claim 1, wherein the power interruption circuit includes a relay mechanism configured to actuate the set of movable contacts from a coupled state to an uncoupled state.

28. The device of claim 27, wherein the reset mechanism drives the set of movable contacts from the uncoupled state to the coupled state in the unlocked state, but cannot drive the set of movable contacts from the uncoupled state to the coupled state in the lock-out state.

29. The device of claim 1, wherein the power interruption circuit includes a bus bar mechanism configured to actuate the set of movable contacts from a coupled state to an uncoupled state.

30. The device of claim 29, wherein the reset mechanism drives the set of movable contacts from the uncoupled state to the coupled state in the unlocked state, but cannot drive the set of movable contacts from the uncoupled state to the coupled state in the lock-out state.

31. The device of claim 1, wherein the device further comprises one of a receptacle, switch, circuit breaker, module, and portable housing containing the device.

32. A protective device including a plurality of line terminals configured to be connected to an electrical distribution system and a plurality of load terminals configured to be connected to at least one load, comprising:
- a fault detection circuit coupled to the plurality of line terminals and the plurality of load terminals, the fault detection circuit being configured to detect at least one fault condition;
- a power interruption circuit coupled to the fault detection circuit, the power interruption circuit including a set of movable contacts configured to decouple the plurality of line terminals from the plurality of load terminals in response to the fault detection circuit detecting the at least one fault condition;
- a reset mechanism coupled to the power interruption circuit and configured to actuate the movable contacts to re-couple the plurality of line terminals to the plurality of load terminals;
- a lock-out mechanism coupled to the reset mechanism, the lockout mechanism including a spring mechanism configured to drive the reset mechanism into a lock-out state, and a fuse element coupled to the spring mechanism to prevent the spring mechanism from moving in an unlocked state; and
- a test circuit coupled to the fault detection circuit and the lock-out mechanism, the test circuit being configured to provide a simulated fault signal to the fault detection circuit, the test circuit being configured to open the fuse element to thereby drive the lock-out mechanism from the unlocked state to the lock-out state if the fault detection circuit and/or power interruption circuit fails to respond to the simulated fault signal within a predetermined period of time.

33. The device of claim 31, wherein the fuse mechanism includes a resistor.

34. A protective device including a plurality of line terminals configured to be connected to an electrical distribution system and a plurality of load terminals configured to be connected to at least one load, comprising:
- a fault detection circuit coupled to the plurality of line terminals and the plurality of load terminals, the fault detection circuit being configured to detect at least one fault condition;
- a power interruption circuit coupled to the fault detection circuit, the power interruption circuit including a set of movable contacts configured to decouple the plurality of line terminals from the plurality of load terminals in response to the fault detection circuit detecting the at least one fault condition;
- a reset mechanism coupled to the power interruption circuit and configured to actuate the movable contacts to re-couple the plurality of line terminals to the plurality of load terminals;
- a lock-out mechanism coupled to the reset mechanism, the lockout mechanism being configured to disable the reset mechanism in a lock-out state; and
- a test circuit including a first circuit element coupled to the fault detection circuit and a second circuit element coupled to the lock-out mechanism, the first circuit element being configured to provide a simulated fault signal to the fault detection circuit, the second circuit element being configured to drive the lock-out mechanism from an unlocked state to the lock-out state if the fault detection circuit and/or power interruption circuit fails to respond to the simulated fault signal within a predetermined period of time.

* * * * *